(12) United States Patent
Stephens (10) Patent No.: US 6,885,719 B2
(45) Date of Patent: Apr. 26, 2005

(54) METHOD AND COMPOSITIONS FOR GROUTING DECOMMISSIONED NUCLEAR REACTOR COMPONENTS

(76) Inventor: Patrick J Stephens, P.O. Box 32330, 1997 Division St., Hellingham, WA (US) 98228

( * ) Notice: Subject to any disclaimer, the term of this patent is extended or adjusted under 35 U.S.C. 154(b) by 0 days.

(21) Appl. No.: 10/402,535

(22) Filed: Mar. 28, 2003

(65) Prior Publication Data

US 2004/0202273 A1 Oct. 14, 2004

(51) Int. Cl.$^7$ .............................................. G21C 19/00
(52) U.S. Cl. ......................... 376/272; 250/506.1; 588/3
(58) Field of Search ...................... 376/272; 250/506.1, 250/507.1; 588/3

(56) References Cited

U.S. PATENT DOCUMENTS

| | | | |
|---|---|---|---|
| 5,063,967 A | * | 11/1991 | Stephens ...................... 138/98 |
| 5,176,752 A | * | 1/1993 | Scheiner ..................... 106/737 |
| 5,241,993 A | * | 9/1993 | Stephens ...................... 138/98 |
| 5,791,378 A | * | 8/1998 | Stephens ...................... 138/98 |
| 5,803,596 A | * | 9/1998 | Stephens ...................... 366/10 |
| 5,819,186 A | * | 10/1998 | Stephens ....................... 588/3 |
| 6,087,546 A | * | 7/2000 | Griffiths et al. ................ 588/3 |
| 6,167,912 B1 | * | 1/2001 | Stephens ...................... 138/98 |
| 6,452,993 B1 | * | 9/2002 | Aoki et al. .................. 376/272 |
| 6,502,636 B2 | * | 1/2003 | Chatterji et al. ............ 166/293 |
| 6,569,924 B2 | * | 5/2003 | Shendy et al. ................. 524/5 |
| 6,617,484 B1 | * | 9/2003 | Tuite et al. ................... 588/16 |

* cited by examiner

Primary Examiner—Harvey E. Behrend
(74) Attorney, Agent, or Firm—Todd N. Hathaway (57) ABSTRACT

A method for grouting a decommissioned nuclear reactor containing residual water. A first, water-absorbent grout is used to grout the bottom portion of the reactor vessel. The water-absorbent grout is formed of cement and a water-absorbent particulate material, such as expanded perlite, exfoliated vermiculite or granulated bentonite. Excess water is absorbed by the particulate material, so that the residual water is incorporated in the fill material when it sets. A set retarder may be included to extend the time for uptake of residual water by the particulate material. Foam may also be included to reduce density and increase pumpability. The remaining, upper portion of the reactor vessel is grouted using lightweight cellular cement grout, lacking the water-absorbent particulate material, so that total weight of the fill remains low enough that the grouted vessel can be removed using the facility's installed crane system. Because the residual water is incorporated in the first, water-absorbent grout, the problem of residual water causing dissipation and collapse of the bubble structure in the lightweight cellular cement grout is obviated.

7 Claims, 4 Drawing Sheets

METHOD AND COMPOSITIONS FOR GROUTING DECOMMISSIONED NUCLEAR REACTOR COMPONENTS

BACKGROUND a. Field of the Invention

The present invention relates generally to the removal of components from decommissioned nuclear power plants and similar facilities, and, more particularly, to the filling of decommissioned nuclear reactor vessels with cellular cement grout prior to transportation to a depository or other disposal site.

b. Related Art

The decommissioning of nuclear power plants and other nuclear facilities normally involves removing the reactor components from the facility and transporting them to a long-term containment area, typically in an arid and remote region.

Chief of these components is the reactor vessel itself. Conventionally, the reactor vessel comprises a tall (e.g., 40–60 feet), generally cylindrical steel shell. The core, which somewhat resembles the tubing of a boiler, is typically located towards the bottom of the shell, with various inlet and outlet pipes being provided in the upper parts of the vessel. During normal operation, the reactor vessel is kept filled with water, with the hot outflow being employed to power turbines or other generation equipment.

The reactor vessel is normally housed in a reactor building, a prominent, frequently domed structure that is designed to contain contamination from the vessel in the event of catastrophic failure. During decommissioning, the reactor vessel must be filled with cement prior to removal from the reactor building. The cement stabilizes the core and other internal components of the vessel for movement and transportation, during which the vessel will normally be positioned on its side on a rail car, barge or other vehicle. The cement also provides shielding around the radioactive core in place of the original water, significantly reducing exposure doses of personnel engaged and preparing the vessel for transport.

A difficulty can arise, however, when removing the cement-filled vessel from the reactor building. Reactor buildings are almost universally provided with installed crane systems that were used to install the reactor vessels when the facilities were first built, and for use in subsequent maintenance activities. As a rule, however, the original designs did not fully anticipate current decommissioning procedures and requirements. The installed cranes are consequently capable of lifting the reactor vessels when empty, but, within safe limits, are unable to lift (commonly referred to as "picking") the vessels if full of heavy cement grout.

An effective solution has been found in the use of lightweight cellular cement grouts. As is known to those skilled in the relevant art, such grouts generally employ a mixture of hydraulic cement (typically, ordinary Portland cement) and a cellular foam material. The cellular cement grout material has a highly fluid consistency and is able to flow throughout the interior of the vessel and into the various chambers and conduits, and when cured forms a rigid mass that effectively stabilizes the internal components for removal and transportation. The water in the cellular cement grout, which remains in the cement matrix when hydrated, provides a shielding effect that helps substitute for the water that filled the vessel when in operation, as do certain mineral constituents of the cement. The cellular foam, in turn, forms pockets of air (or other gasses) within the matrix and therefore reduces the overall weight of the fill material to a level where the vessel can still be "picked" and removed using the installed crane Although cellular cement grout thus provides an optimal fill material, its use is complicated by the fact that all water must be removed before filling the vessel with grout. If the cellular grout encounters significant amounts of water within the vessel an excessively high water-to-cement ratio will be created at the interface, so that the cellular structure of the grout will tend to dissipate and collapse in a progressive fashion. As this happens, more and more grout is needed to fill the reactor vessel and overall density quickly rises, potentially to the point where the safe weight limit is exceeded.

Removing all water from the vessel prior to grouting, however, involves considerable difficulty and expense. Although the bulk of the water can be removed using installed piping and suction hoses, a significant amount (typically, approximately 200 gallons) remains trapped and virtually inaccessible in the bottom of the vessel, primarily beneath a baffle structure that is usually installed near the bottom of the vessel beneath the core. This area can be reached, if at all, only through very small (e.g., 1-inch) tubes and openings. Drilling a hole through the bottom of the shell to drain the residual water is generally impractical; the steel of the shell is very thick (e.g., 8-inches) and tough and the stay time necessary to drill through it would be excessive, particularly in view of the relative lack of shielding as the vessel becomes emptied of water. Furthermore, the water and residual radioactive materials in the bottom of the shell present serious safety hazards, should these happen to escape from the hole and expose personnel during the drilling operation. In this regard, it should be noted that strict limits have been set for lifetime radiation exposure, and it is therefore critical that exposures be minimized lest it become necessary to retire and replace trained personnel.

Consequently, even with the most diligent of efforts, a minimum of 4–12 inches of residual, contaminated water usually remains in the bottom of the vessel, creating an ever-present threat to the success of the grouting operation.

Accordingly, there exists a need for a method for filling a decommissioned nuclear reactor vessel with cellular cement grout while accommodating the presence of residual water in the bottom of the vessel. Furthermore, there exists a need for such a method that produces a fill having a total density sufficiently low that the reactor vessel can be picked and removed using the installed crane system of the reactor building. Still further, there exists a need for such a method that obviates the possibility of the cellular structure of the grout dissipating or collapsing during the filling operation. Still further, there exists a need for such a method that uses economical materials/equipment and that can be performed in an efficient manner with minimal exposure of operating personnel.

SUMMARY OF THE INVENTION

The present invention has solved the problems cited above, and is a method for grouting a decommissioned reactor vessel having residual water in a bottom portion thereof, without exceeding a predetermined weight limit for lifting.

Broadly, the method comprises the steps of (a) forming a water-absorbent cement grout by mixing a cement slurry and a water-absorbent particulate material, and (b) flowing the water-absorbent cement grout into the bottom portion of the reactor vessel so that the water-absorbent particulate material absorbs excess water from the grout as it intermixes with the residual water.

The step of flowing the cement grout into the bottom portion of the reactor vessel may comprise flowing into the reactor vessel a volume of the water-absorbent grout sufficient to substantially fully absorb the residual water, and allowing the water-absorbent grout to set so as to form a first layer cementitious fill that incorporates the residual water in the bottom portion of the reactor vessel. The method may further comprise forming a second, lightweight cellular cement grout that is substantially free of water-absorbent particulate material, flowing the lightweight cellular cement grout into the reactor vessel atop the first layer of cementitious fill, and allowing the lightweight cellular cement grout to set so as to form a second, relatively lighter layer of cementitious fill in an upper portion of the vessel, so that combined weight of the cementitious fills remains sufficiently low that total weight of the reactor vessel remains within the predetermined limits for lifting.

The step of forming the water-absorbent cement grout may further comprise mixing a fluidity-enhancing component with the cement slurry and water-absorbent particulate material. The fluidity-enhancing component may comprise a bentonite gel.

The step of forming the water-absorbent cement grout may comprise selecting the water-absorbent particulate material from the group consisting of expanded perlite, exfoliated vermiculite and granulated bentonite.

The step of forming the water-absorbent cement grout may further comprise mixing a foam material with the cement slurry and water-absorbent particulate material so as to form a cellular water-absorbent cement grout. The foam material may be aqueous finished foam. The water-absorbent particulate material may be included in an amount sufficient to maintain the water-to-cement ratio of the water-absorbent grout within a predetermined range such that dissipation and collapse of the cellular bubble structure of the grout is avoided as the residual water is absorbed.

A set retarder may be included in a predetermined amount so as to increase the time over which the particulate material is able to absorb excess water prior to setting of the grout.

These and other features and advantages of the present invention will be more apparent from a reading of the following detailed description with reference to the accompanying drawings.

DETAILED DESCRIPTION a. Overview

Figure 1:
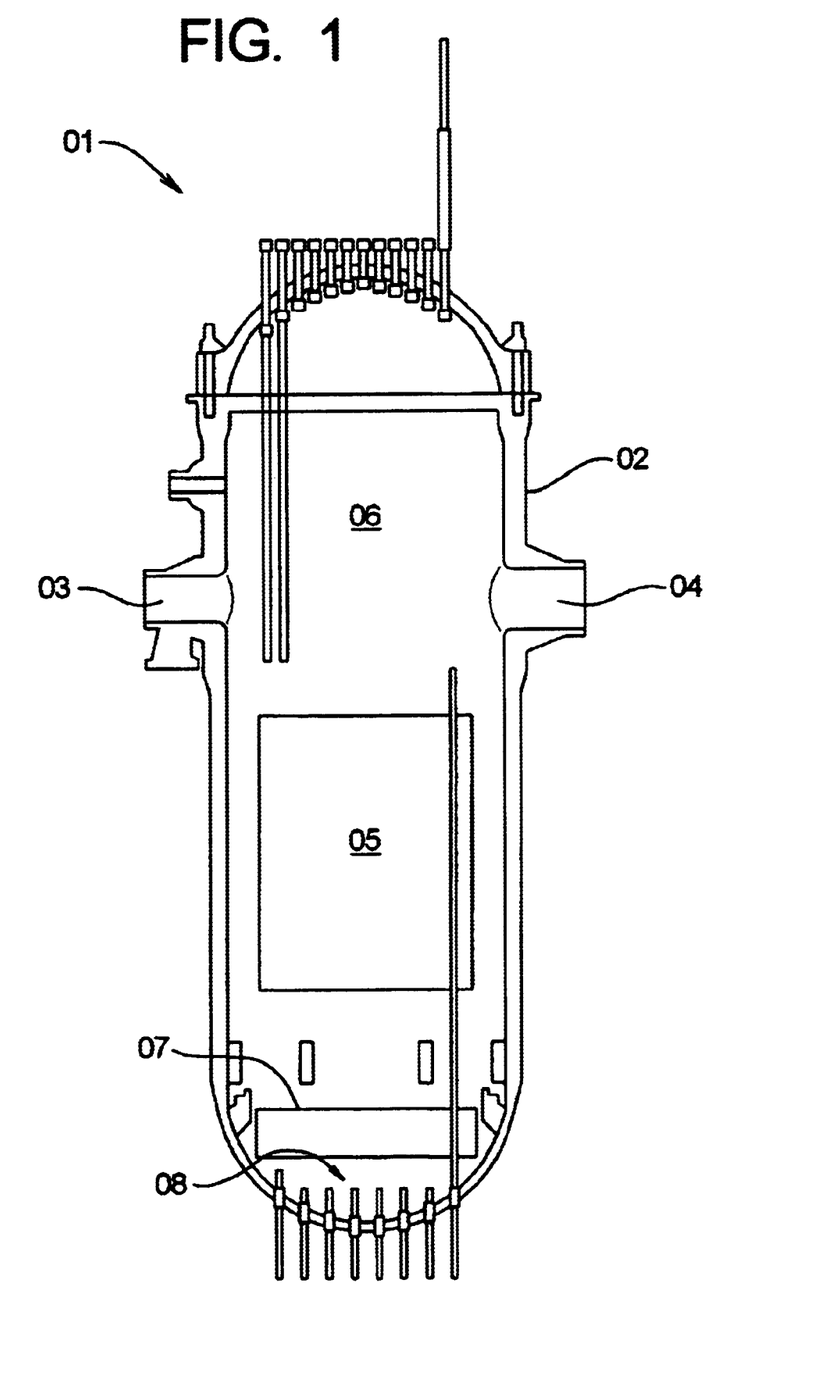
FIG. 1 is a cross-sectional, somewhat simplified view of a typical reactor vessel, showing the location of the core and the main circulation fittings, and the inaccessible area below the core where residual water remains when the reactor is decommissioned.
Figure 2:
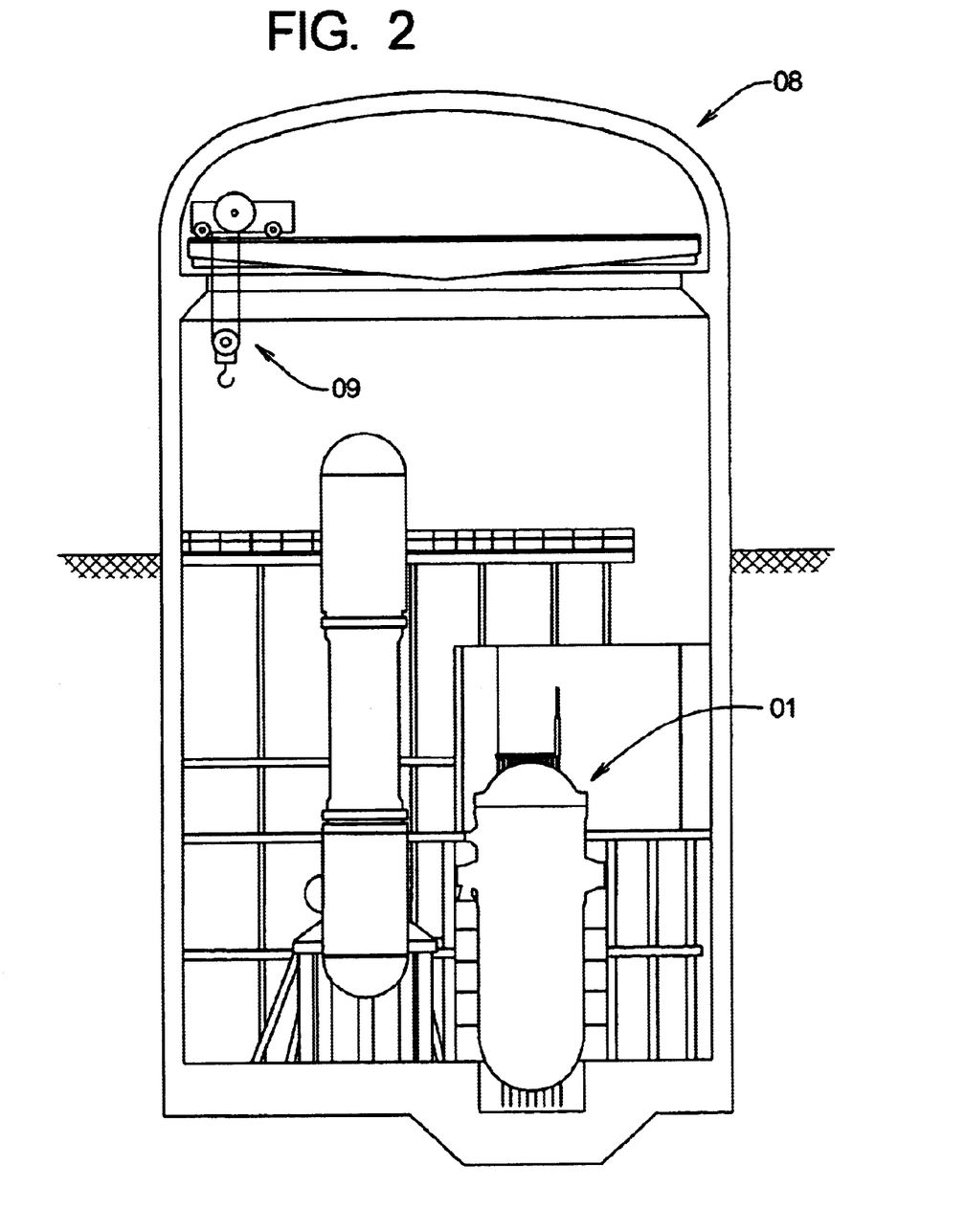
FIG. 2 is a cross-sectional, somewhat simplified view of a typical reactor building, showing the manner in which the reactor vessel is installed therein and the installed crane system with which the reactor building is provided.

For reference, FIG. 1 shows a typical reactor vessel 01. As can be seen, the reactor vessel includes a shell 02 formed of thick (e.g., 8-inch) steel, having inlet and outlet nozzles 03, 04. The core 05 is mounted towards the lower end of the hollow interior 06 of the vessel, with the flow baffle 07 being mounted in the lower end of the vessel in the area beneath the core. FIG. 2, in turn, shows a typical reactor building 08 that includes an installed crane 09 such as is used to lift and remove the reactor vessel in the method of the present invention. It will be understood that the configurations of the reactor vessels and buildings will vary somewhat from one installation to the next, but the majority are similar overall. Furthermore, it will be understood that while the present invention is illustrated herein primarily in the context of a nuclear power plant, as for generating electricity, the method of the present invention may be employed in connection with the decommissioning of other types of reactors having different purposes, e.g., research or propulsion-type reactors.

As was discussed above, during normal operation the interior 06 of the reactor vessel is filled with water that is circulated through the nozzles 03, 04. During decommissioning most water is removed through the nozzles or other openings in the upper end of the shell, however, residual water remains trapped in the accessible area 08 below the baffle.

To address the problem of the residual water, the present invention employs a grout material having as its primary components (i) a cement slurry and (ii) a granular water-absorbent material, in most instances in combination with (iii) a fluidity-enhancing component, and in some instances including (iv) a cellular foam material as well. As the grout is flowed into the reactor vessel and encounters the residual wastewater, the granular water-absorbent material absorbs excess water in the grout. Where a cellular water-absorbing grout is used, the water-absorbent material also maintains the water-cement ratio within acceptable limits so as to prevent dissipation and collapse of the cellular bubble structure. The residual water is thereby drawn into and incorporated into the cementitious matrix of the grout when cured.

The reactor vessel is normally filled in multiple lifts, with only the initial lift or lifts being made using the absorbent grout, until the residual water has been fully absorbed. The remaining lifts are made with conventional, lightweight cellular cement grout, without the water-absorbent particulate material and without the higher water-cement ratio that the water-absorbent material requires), so that overall density and therefore total weight of the fill material remains sufficiently low. Since the residual water has been absorbed in the initial lift or lifts, the remaining lifts can be performed without fear of the cellular structure dissipating or collapsing due to excess water. The filled reactor vessel can then be picked and removed using the installed crane system of the reactor building or other facility.

b. Grout Constituents

As was noted above, the principle constituents of the water-absorbing grout of the present invention are cement slurry and a particulate water-absorbent component. A fluidity-enhancing component and cellular foam material will usually be included, however, the latter may not be required in all applications: as will be described in greater detail below the need for these components may vary with the physical qualities of the particulate material and other aspects of the particular application.

The cement slurry component may be formed using any suitable hydraulic cement. Preferably, ordinary Portland cement is used, mixed with water in an amount sufficient to maintain fluidity and compressive strength requirements, taking into account the absorptive factor of the particulate material. The initial water-to-cement ratio will therefore ordinarily be somewhat higher than in a corresponding grout lacking the water-absorbent material. Additional binders and fill materials, such as fly ash, may be included in significant amounts, within the constraints of the compressive strength requirements that have been established for the cured grout.

For most applications the cement slurry will include a set retarder that slows hydration of the cement, so that sufficient time is allowed for excess water to be fully absorbed before the material sets. Suitable retarders are available from numerous sources, e.g., Pozzolith® 100XR, available from MasterBuilders, Inc., Cleveland, Ohio. Various other admixtures known to those skilled in the art may also be included with the cement component of the grout.

For enhanced fluidity, and in order to provide a more stable bubble structure when foam is incorporated, the cement slurry may be colloidally mixed prior to use. This produces a finer, more fluid slurry that also more evenly coats the individual bubbles of the foam. The colloidal mixing may be performed using a high speed, high shear pump which circulates the slurry material to a holding tank until the cement particles are finely divided and evenly coated by the water molecules.

The water-absorbent particulate component, in turn may be any suitable water absorbing material, of natural or synthetic origin. Exfoliated vermiculite, ground to a medium or fine grade, is eminently suitable for several reasons: Firstly, this material is capable of absorbing a large amounts of water rapidly, but not so rapidly as to be fully saturated by absorbing water from the cement slurry before the grout has mixed with the residual water in the reactor vessel. Moreover, medium or fine crushed vermiculite exhibits satisfactory flowability characteristics and minimally impairs the ability of the grout to flow through tubes and small openings within the core and other parts of the reactor. Crushed vermiculite also becomes well integrated into the cementitious matrix when cured, exhibits adequate compressive strength such that the overall compressive strength of the fill material is not compromised, and is inexpensive and readily available from numerous sources. As is well known, vermiculate is a naturally-occurring phyllosilicate mineral that expands many times its original volume when heated, creating interstices for absorption of water, the individual particles having a granular, typically somewhat cubic shape. Suitable grades of exfoliated vermiculite are available from the Schundler Company, Metuchen, N.J., and numerous other sources.

Another water-absorbent particulate material highly suitable for use in the present invention is expanded perlite, which may be used in combination with or in place of the vermiculite described above. Perlite is a form of volcanic glass that expands and becomes porous when crushed and heated. The heating creates a series of crescent-shaped cracks, so that the resultant granules are typically small, rounded, pearl-shaped pieces. The rounded shape is somewhat advantageous relative to vermiculite in terms of fluidity. As additional advantages, perlite typically exhibits a more neutral pH and a somewhat higher compressive strength than vermiculite. However, these advantages may be offset somewhat by the slower absorption rates and lower total absorptivity that are typically exhibited by perlite, so that more of the material must be used.

Yet another material suitable for use as the water-absorbent particulate material is granulated bentonite. Granulated bentonite has the advantage of very high absorptivity, being able to absorb up to 30 times its weight in water. It can also add a degree of radiation shielding, as will described in greater detail below. However, it is somewhat denser/heavier than vermiculite and perlite, and also tends to absorb water at a significantly slower rate than these other materials. Granular bentonite is available from a great many sources, its most common commercial use being for absorbent "kitty litter" in cat boxes.

It will be understood that numerous other suitable, water-absorbent particulate materials may be included in or used for the water-absorbing component of the grout of the present invention, including, for example, other types of expanded mineral materials, and various fibrous or porous materials such as sawdust, waste paper or porous ceramics.

In most applications, the water-absorbing grout mixture will also include a fluidity-enhancing component. The primary purpose of the fluidity-enhancing component is to compensate for reductions in fluidity produced by the water-absorbent particulate material. Bentonite gel is eminently suitable for this purpose, due to its effectiveness, wide availability and low cost. The bentonite gel forms a very smooth, highly fluid coating on the particulate material, so that the cellular grout pumps easily and flows into the relatively inaccessible areas of the vessel. Thus, although it may not be used in all embodiments, bentonite gel is particularly beneficial in compositions that employ comparatively angular or irregularly shaped particulate materials, such as vermiculite or perlite.

The bentonite gel also encases the individual bubbles that form the cellular structure when foam is used, tending to further increase the stability of the cellular structure and reducing the possibility of collapse. The bentonite gel also helps form a bubble structure that is sufficiently strong to support the particulate component of the mixture.

Another benefit of the bentonite component is that this provides an additional degree of radiation shielding. Bentonite materials, which are naturally occurring clay materials, contain complicated silicon structures and water, together with large amounts of light metals, which are neutron radiation barriers. The bentonite component thus augments the shielding that is provided by the grout in place of the water that originally filled the reactor vessel. Still further, the bentonite component renders the grout substantially water-impervious when cured, which provides benefits for long-term storage under various environmental conditions.

It should be understood that other suitable fluidity-enhancing materials may be used in conjunction with the bentonite or possibly in place of it. For example, POLYOX™, water-soluble resins, available from the Dow Chemical Company, may be used in some embodiments. Superplasticizers and similar admixtures may also be included to enhance fluidity. An example of a suitable superplasticizer is that available under the trademark "Super P" from Anti-Hydro International, Inc., Flemington, N.J. Another suitable plasticizer, that also incorporates a set retarder, is DELVO™, available from MasterBuilders Inc.

The amount of bentonite gel and/or other fluidity-enhancing components required will depend to a large extent on the fluidity characteristics of the water-absorbent particulate material, which in the case of vermiculite, perlite, granular bentonite, and other natural-source materials can be highly variable.

Similarly, the foam component, which in addition to reducing weight also serves to enhance fluidity and pumpability, may not be used in the water-absorbing grout in all embodiments. In those instances where it is used, the foam component of the grout is preferably provided by a pre-generated, finished foam material that is mixed with the fluid cement slurry. The finished foam may be generated using any of the many suitable foam-generation materials known to those skilled in the art for the production of cellular cements and grouts. Aqueous foam materials are generally preferred, in which a foam concentrate material similar to a surfactant is diluted with water to form a solution that is then mixed with air. Examples of suitable foam concentrate materials include "GEOCELL Foam Liquid", available from the Mearl Corporation, South Park, N.J.

The foam concentrate-water solution and air are passed through a foam conditioner to produce a finished foam material having a micro-bubble structure. To minimize weight, the foam density should generally be selected so as to produce a relatively strong bubble structure that will survive to produce a cellular structure when the grout cures. For example, a water-concentrate solution mixed with air to produce a foam weight in a range from about 2.25–4.0 lbs/cubic foot (pfc) will be suitable for many applications. The production of finished foam and mixing thereof with cement slurry to produce a foamed cement grout is more fully described in U.S. Pat. No. 5,419,632, the entirety of which is incorporated herein by reference.

As was noted above, only the initial lift or lifts will ordinarily be performed using the water-absorbing grout described in this section, with subsequent lifts being performed using more conventional lightweight cellular grout that lacks the water-absorbent particulate component.

c. Mixing and Placement of Grout

Figure 3:
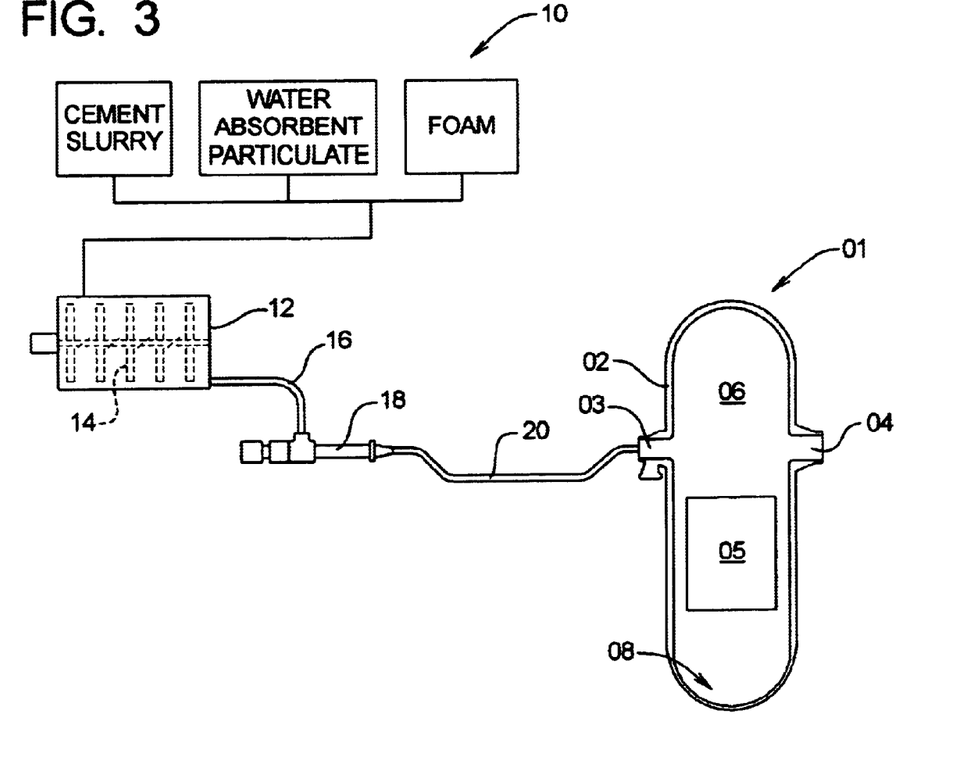
FIG. 3 is a schematic view of a system for mixing cement grout in accordance with the present invention, and for then flowing the grout into the reactor vessel in preparation for removal from the reactor building.
Figure 4A:
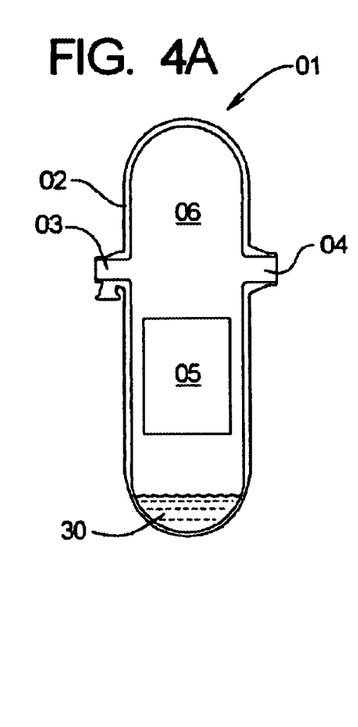
FIGS. 4A–4D are sequential, cross-sectional views showing the steps by which the decommissioned reactor vessel is filled with cement grout in accordance with the present invention.
Figure 4B:
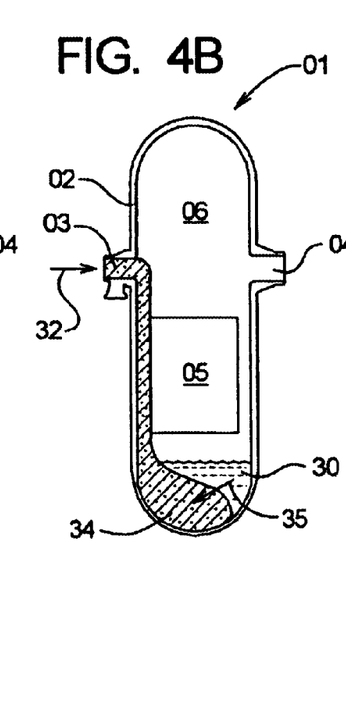
Figure 4C:
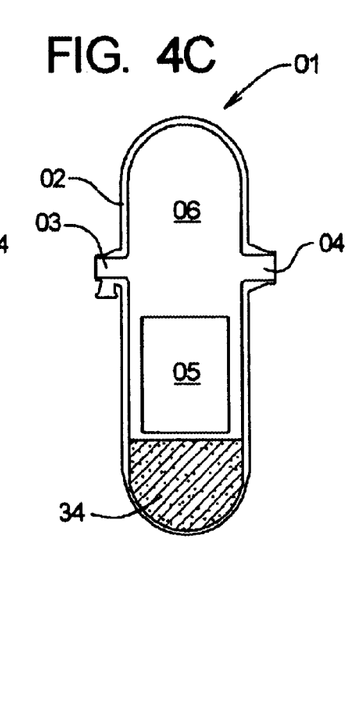
Figure 4D:
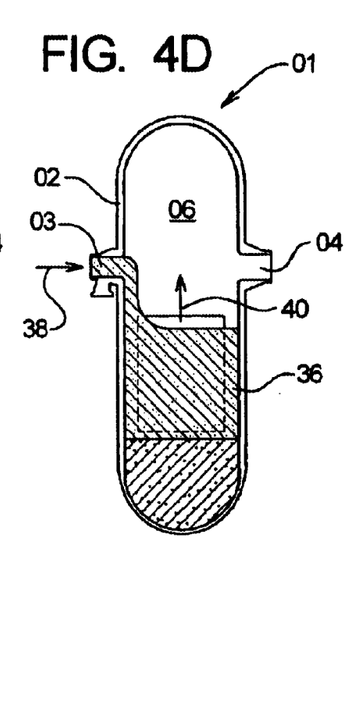

FIG. 3 illustrates a batch-type system 10 for mixing and placing the grout composition within a decommissioned reactor vessel in accordance with the present invention. As noted above, continuous mixing and pumping systems may also be employed.

As can be seen, the batch-type system includes a tub 12 into which the cement slurry and water-absorbent particulate material are fed and then combined by a mixer 14 to produce the pumpable cement grout material described above. The bentonite gel or other fluidity-enhancing component, where included, will normally be added as a part of the cement slurry, although it too may be combined within the mixer tub. As can be seen in FIG. 3, the finished foam (when used) may be added and mixed in tub 12, although it may also be added at the intake side of the pump or another location.

The resulting cement grout is fed through a conduit 16 to the intake side of a pump 18, from which it is discharged under pressure through an injection hose 20. The pump 18 may of any suitable type, however, a progressive-cavity, positive-displacement pump, such as those available under the trademark MOYNO™ from Robbins & Myers, Inc., Springfield, Ohio, are particularly advantageous in that they allow a high degree of control over the flow rate and also cause minimal damage to the bubble structure of cellular grout.

The discharge end of the injection hose 20 is connected to an injection fitting at the intake nozzle 03 (see FIG. 1) or other suitable inlet on the reactor vessel, so that the cellular grout discharged from the pump enters the interior 06 of the vessel. In order to direct the water absorbent grout towards the area 08 at the bottom of the vessel, a lance may be inserted downwardly in the gap between the shell 02 and the side of the reactor core 05, although in some instances the grout may simply be allowed to flow through this area under gravity.

The reactor vessel is preferably grouted in two or more lifts, using only enough of the water-absorbent grout to ensure that the residual water in the bottom of the vessel is fully absorbed. Since it is usually very difficult to determine the exact amount of residual water present, and also because of the variable nature of vermiculite, perlite, granulated bentonite and other materials of natural origin, a rough rule of thumb is to perform the first lift using approximately 400 gallons of water-absorbing grout for each estimated 100 gallons of residual water. For example, if an estimated 200 gallons of residual water is present, then the first lift is performed using 800 gallons of the water-absorbing grout.

Subsequent lifts are preferably made with ordinary lightweight grout, lacking the water-absorbent particulate component, so as to achieve adequate compressive strength with minimal weight. It will be understood, however, that in some instances it may be possible or desirable to make the entire fill using the water-absorbent particulate, if compressive strength requirements and load capacities of the removal equipment permit.

FIGS. 4A–4D show the sequential steps in grouting a reactor vessel in accordance with a preferred embodiment of the invention. It will be understood that certain aspects have been exaggerated and/or simplified in the drawings for ease of illustration. Moreover, it will be understood that the figures are not meant to be an accurate depiction of the actual flow paths and intermixing of fluids that occur within the reactor vessel.

As noted above and as can be seen in FIG. 4A, a significant amount of residual water 30 remains in the bottom of the reactor shell 02 after draining has been completed. To implement the first phase of grouting, the water-absorbent cellular cement grout 34, containing the particulate material, is mixed as described above and is pumped through inlet nozzle 03 via injection hose 20, as indicated by arrow 32 in FIG. 4B. The water-absorbent grout is injected downwardly towards the bottom of the reactor vessel, where the residual water intermixes with and is absorbed into the grout, as indicated by arrow 36.

In general, the elapsed time between mixing of the grout and injection should be kept to a reasonable minimum, in order to minimize the extent to which the particulate material withdraws water from the grout before coming into contact with the residual water. Consequently, it is generally desirable to position the mixing tub in relatively close proximity to the injection pump, and to employ an injection pump having the capacity to convey the grout to the reactor vessel at a comparatively high rate.

As described above, the amount of water-absorbent grout injected in the initial phase is preferably selected to be equal to (or slightly more than) the amount needed to fully absorb the residual water—based on the estimated amount of water present and the amount and absorptive capacity of the absorbent particulate material—while still yielding a final water-to-cement ratio within an acceptable, predetermined range. After the first lift, injection is terminated and the water-absorbent grout is allowed to cure so as to form a solid mass or layer of fill material, as shown in FIG. 3C. If the residual water has not been fully absorbed, one or more additional, usually smaller lifts may be performed using the water-absorbent mix. When using low-density, lightweight water-absorbent particulate materials such as vermiculite and perlite, small amounts of the material will tend to "float" to the top of the grout so as to form an interface layer that helps prevent any remaining, unabsorbed water from interfering with subsequent lifts.

After injection of the water-absorbent grout has been completed, the mixing system is adjusted to produce lightweight cellular cement grout having the desired density, compressive strength and other qualities, normally without including the water-absorbent particulate material. The non-absorbent grout 36 is then pumped through the injection line and into the reaction vessel in the direction indicated by arrow 38 in FIG. 4D, building upwardly on the solid mass provided by the initial lift or lifts in the direction indicated by arrow 40. Once the interior of the reactor vessel has been filled to the desired extent, injection is terminated and the grout is allowed to cure. The vessel is then removed and transported in a conventional manner.

d. Mix Parameters

Because of their natural origins, vermiculite, perlite, granulated bentonite and similar materials may vary significantly from batch to batch, in terms of their absorptive rates and capacities, particulate geometries, and other physical characteristics. As a result, a degree of preliminary testing is ordinarily required before commencing each project, using the particular materials that have been acquired for that job.

Limiting factors in preparing the water absorbing grout are fluidity, pumpability and weight. In some instances, particularly where the water-absorbent particulate material has good flowability characteristics, a minimal amount of the bentonite gel may be needed, or perhaps none at all. The same holds for the foam component. In most instances, however, significant amounts of the bentonite gel will be required in order to achieve satisfactory fluidity, even more so than working with angular particulates such as vermiculite and granulated bentonite. Similarly, the foam component is added as necessary to adjust the fluidity of the grout, and also its wet and cured densities. Stable bubble aqueous foam also tends to coat the inside surfaces of hoses and other conduits, with bubbles that migrate outwardly from the grout passing therethrough, so that it may be desirable to include additional amounts of foam in situations where the cellular cement grout must pass through a comparatively long pipe or hose before reaching the reactor vessel.

It is generally preferable that the cellular cement grout be mixed to have a wet density of 62.5 pcf or heavier, so that the grout will flow down into the residual water and mix with it rather than floating on top. 90 pcf is a practical maximum in most instances, due to excessive weight and also because the effectiveness and advantages of the water-absorbent particulate material tend to be minimal beyond that point.

The following Table 1 provides approximate ranges for an example mix design for water-absorbent grout having a 1.0-water/cement ratio that has been found suitable for many applications of the method of the present invention. It will be understood that, as noted above, the relative amounts of individual components may vary greatly depending on the consistency and quality of the materials and other factors; in particular, the amount of bentonite required can be highly variable. Moreover, it will be understood that the water/cement ratio may vary significantly depending on these and other factors, although in most applications the ratio will preferably be within the range from about 0.5 to abut 1.5.

TABLE 1

| Material | Measure | Volume (cf) | Weight (lbs) | Unit Weight (pcf) |
| --- | --- | --- | --- | --- |
| Perlite | 4–6 sacks | 16–24 | 176–264 | 11 (approx) |
| Cement | 10 sacks | 10 | 940 | 94 |
| Water | 113 gallons | 15 | 940 | 62.4 |
| Bentonite | 1–4 sacks | 1.5–5.5 | 50–200 | 37 (approx) |
| Superplasticizer/Retarder (Delvo ™) | 2–20 oz | — | — | — |

TABLE 1-continued

| Material | Measure | Volume (cf) | Weight (lbs) | Unit Weight (pcf) |
| --- | --- | --- | --- | --- |
| Superplastizer (Super P ™) | 6–50 oz | — | — | — |

The actual volume of the resultant grout will be less than the combined volumes of the constituents, and the actual unit weight (pcf) will be somewhat higher than the combined unit weights. Both result largely from the absorptive factor of the water-absorbent particulate in the mix, i.e., perlite in this example.

It will be understood that Table 1 provides only one example of a mix design suitable for implementing the method of the present invention, and that, as noted above, a wide range of other materials and proportions may be used.

It is to be recognized that various alterations, modifications, and/or additions may be introduced into the constructions and arrangements of parts described above without departing from the spirit or ambit of the present invention as defined by the appended claims.

What is claimed is:

1. A method for grouting a decommissioned reactor vessel, said reactor vessel having a predetermined amount of residual water in a bottom portion thereof, said method comprising the steps of:

forming a first, water-absorbent cement grout by mixing:
      a cement slurry; and
      a water-absorbent granular particulate material;

flowing a selected amount of said water-absorbent cement grout into said bottom portion of said reactor vessel so that said water-absorbent particulate material absorbs excess water from said grout as said grout intermixes with said residual water;

said selected amount of said water-absorbent cement grout being limited to an amount approximately sufficient to fully absorb said predetermined amount of residual water in said reactor vessel;

allowing said first, water-absorbent cement grout to set so as to form a first layer of cementitious fill that incorporates said residual water;

forming a second, lightweight cellular cement grout by mixing:
      a cement slurry; and
      a cellular foam material;

flowing said lightweight cellular cement grout into said reactor vessel atop said first layer of cementitious fill in which said residual water has been incorporated; and allowing said second, lightweight cellular cement grout to set so as to form a second, relatively lighter layer of cementitious fill in an upper portion of said vessel.

2. The method of claim 1, wherein the step of forming said first, water-absorbent cement grout comprises:

selecting said water-absorbent granular particulate material from the group consisting of:
      perlite;
      vermiculite; and
      granulated bentonite.

3. The method of claim 2, wherein the step of forming said first, water-absorbent cement grout comprises:

mixing bentonite gel with said cement slurry and water-absorbent granular particulate material so as to enhance fluidity of said water-absorbent cement grout.

4. The method of claim 3, wherein the step of forming said first, water-absorbent cement grout further comprises:

adding a set retarder so as to increase time in which said granular particulate material is able to absorb excess water prior to setting of said first cement grout.

5. The method of claim 4, wherein the step of forming said first, water-absorbent cement grout further comprises:

mixing finished foam with said cement slurry, granular particulate material and bentonite gel so as to form a water-absorbent cement grout having a cellular bubble structure.

6. The method of claim 5, wherein the step of forming said first, water-absorbent cement grout further comprises:

including said water-absorbent particulate material in an amount sufficient to maintain a water-to-cement ratio of said water-absorbent grout such that dissipation and collapse of said cellular bubble structure is avoided as said residual water is absorbed.

7. The method of claim 1, wherein the step of forming said second, lightweight cellular cement grout comprises:

forming said lightweight cellular cement grout so that said grout is substantially free of water-absorbent granular particulate material.

* * * * *